United States Patent [19]

Makino et al.

[11] Patent Number: 4,750,951
[45] Date of Patent: Jun. 14, 1988

[54] AMORPHOUS ALLOY FOR MAGNETIC HEADS

[75] Inventors: Akihiro Makino; Mikio Nakashima, both of Nagaoka, Japan

[73] Assignee: Alps Electric Co., Ltd., Japan

[21] Appl. No.: 13,370

[22] Filed: Feb. 11, 1987

[30] Foreign Application Priority Data

May 19, 1986 [JP] Japan .................... 61-112798

[51] Int. Cl.⁴ .............................. H01F 1/04
[52] U.S. Cl. ........................ 148/304; 148/403
[58] Field of Search .................. 148/403, 304, 305

[56] References Cited

U.S. PATENT DOCUMENTS 3,856,513  12/1974  Chen et al. ............... 148/403
4,416,709  11/1983  Ohya et al. ............... 148/403
4,464,208  8/1984   Tateishi .................. 148/403
4,473,417  9/1984   Inomata et al. ........... 148/403

FOREIGN PATENT DOCUMENTS 57-116740  7/1982  Japan .................... 148/304
61-69939   4/1986  Japan .................... 148/304

Primary Examiner—John P. Sheehan
Attorney, Agent, or Firm—Guy W. Shoup

[57] ABSTRACT

An amorphous alloy for making a magnetic head comprises a composition of the formula:

$$(Fe_{1-a}, Co_a)_{100-e-f-b} Cr_e Ru_f (Si_c, B_d)_b$$

where a is from 0.93 to 0.95, c/c+d is from 0.55 to 0.65, b is from 22 to 27, e is from 0.4 to 2.6 and f is from 1.5 to 4.0.

2 Claims, 2 Drawing Sheets

AMORPHOUS ALLOY FOR MAGNETIC HEADS

BACKGROUND OF THE INVENTION

1. Field of the Invention

This invention relates to a magnetic alloy which is used for making a magnetic head. More particularly, it is an amorphous alloy consisting mainly of cobalt.

2. Description of the Prior Art

Crystalline metal alloys, such as Permalloys and Sendusts, or oxides, such as Mn-Zn and Ni-Zn ferrites, are mainly used for making magnetic heads. While the crystalline metal alloys have a higher saturation magnetic flux density than that of the ferrites, they have a low resistivity not exceeding 100 μ.cm. Therefore, they have a very low permeability in the frequency range which is employed for a video tape recorder, etc. On the other hand, the ferrites have a high resistivity and show excellent electromagnetic conversion characteristics even in a high frequency range. Moreover, they have a high degree of wear resistance. Therefore, the ferrites, particularly of the Mn-Zn series, are used for making video image reproducing heads, etc. The ferrites, however, have a low saturation magnetic flux density. Therefore, the heads made of the ferrites develop recording strain and produce a great deal of noise.

A high frequency is usually used for obtaining a high density of recording. In order to obtain a magnetic head for high-density recording, it is necessary to use a core formed from a material having a small thickness or a high resistivity to prevent a reduction of permeability due to eddy-current loss. The Sendust alloys have a high saturation magnetic flux density and a higher resistivity than the Permalloys. They are, however, too brittle to form a material having a sufficiently small thickness.

The amorphous alloys have recently been found to have excellent magnetic and mechanical properties. As they have no crystalline structure, they have a resistivity which is several times higher than that of any crystalline metal alloy. As they have no crystalline magnetic anisotropy, they have a low coercive force and a high permeability. Moreover, they have a Vickers hardness of about 1000 which is higher than that of any crystalline metal alloy. There is already known a composition for amorphous alloys which can substantially eliminate any magnetic strain and studies are under way for using amorphous alloys for making cores for magnetic heads.

It is, however, necessary that the amorphous alloys which can be used for making the cores of magnetic heads for high-density recording have a high permeability not only in a low frequency range, but also in a frequency range which is as high as at least 1 MHz. They are required to have:

(1) a high resistivity;
(2) a high initial permeability;
(3) a high degree of wear resistance; and
(4) a high degree of thermal stability.

The inventors of this invention have proposed an amorphous alloy for a magnetic head which is expressed by the formula:

$$(Fe, Co)_{1-b}(Si_c, B_d)_b$$

where
$c+d=1$;
$b=23$ to 27 atom %; and
$c/c+d=0.55$ to 0.65.

This alloy is disclosed in Japanese Patent Application No. 23671/1984. It has a high initial permeability and a high resistivity and shows, therefore, a higher resistivity in a frequency range of at least 1 MHz than the ferrites. Moreover, it has a high degree of wear resistance and a high degree of thermal stability.

SUMMARY OF THE INVENTION

It is an object of this invention to improve the amorphous alloy which has been proposed before as hereinabove described and provide an amorphous alloy for a magnetic head having an improved degree of corrosion and wear resistance and an improved saturation magnetic flux density (B).

This object is attained by an amorphous alloy of the formula:

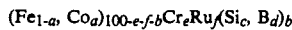

where
$a \doteq 0.93$ to 0.95;
$c/c+d=0.55$ to 0.65;
$b=22$ to 27;
$e=0.4$ to 2.6; and
$f=1.5$ to 4.0.

DETAILED DESCRIPTION OF THE INVENTION

Figure 1:
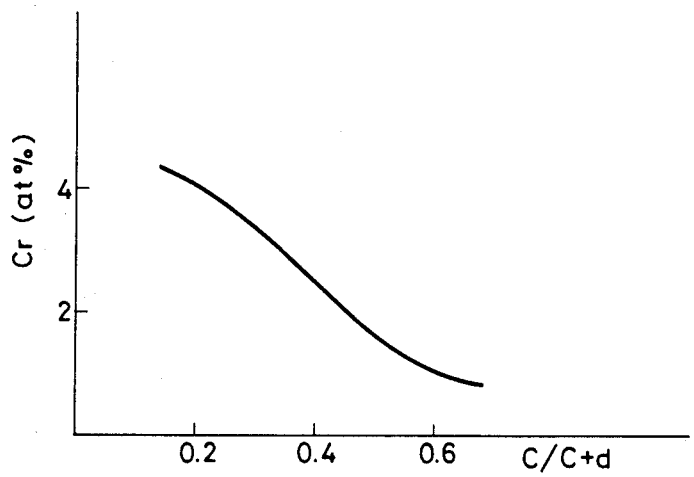
FIG. 1 is a graph showing the relation between the value of $c/c+d$ and the amount of chromium which is required for an alloy composition having a high degree of corrosion resistance.

The amorphous alloys are generally believed to have a high degree of corrosion resistance as they are composed of a solid solution having a single homogeneous phase and as they have a very active surface and are, therefore, easy to passivate. Their corrosion resistance, however, depends largely on their metalloid content and the effectiveness of the additives which they contain. The inventors of this invention have found that the ratio of Si/Si+B in an alloy has a significant bearing on its corrosion resistance.

The alloy of this invention is expressed by the formula:

It is a Co-Si-B alloy which further contains chromium and ruthenium. The addition of chromium improves the corrosion resistance of an amorphous alloy for a magnetic head and depends on the ratio of Si/Si+B in the alloy.

An alloy of the formula having a high ratio of $c/c+d$ has a high degree of corrosion resistance, even if it may have a low chromium content. When the ratio of $c/c+d$ is in the range of 0.55 to 0.65, however, the amount (e) of chromium which is required for the alloy to maintain an appropriately high degree of corrosion resistance is in the range of 0.4 to 2.6 atom %. The addition of ruthenium, as well as chromium, to an Fe- Co-Si-B alloy improves its corrosion resistance, even if it has a low chromium content. It is, however, necessary to add at least 0.4 atom % of chromium and in order to obtain a $B_{10}$ value of at least 8000 G, it is necessary to limit the amount (e) of chromium to a level not exceeding 2.0 atom %. An alloy having a chromium content of 0.4 to 2.0 atom % is required to contain a least 1.5 atom % of ruthenium in order to maintain an appropriately high degree of corrosion resistance. An increase of the amount (f) of ruthenium over 1.5 atom % brings about a gradual improvement in the wear resistance of the alloy. The addition of too large an amount of ruthenium makes it difficult to obtain an amorphous alloy which is easy to machine by punching. For these reasons and also in order to obtain a saturation magnetic flux density (B) which is higher than 8000 G, it is necessary to limit the amount of ruthenium to a level not exceeding 4.0 atom %.

The wear resistance of the alloy according to this invention depends on its ruthenium content. If the values of $c/c+d$, e and f fall within the respective ranges as hereinabove stated, the alloys of the formula according to this invention are substantially of the same wear resistance as long as the values of a and b are from 0.93 to 0.95 and from 22 to 27, respectively. The value of a in the range of 0.93 to 0.95 is also necessary for obtaining an amorphous alloy which is free from any magnetic strain.

If the value of b, which represents the amount of the metalloids (Si and B), exceeds 27 atom %, the alloy has too low a saturation magnetic flux density to be suitable as a material for making the core of a magnetic head. If the value of b is smaller than 20 atom %, it is difficult to obtain a uniformly amorphous alloy having a satisfactorily high permeability. It is necessary to employ at least 22 atom % of Si and B in order to ensure the production of any sheet of an amorphous alloy having a thickness of at least 40 μm.

The invention will now be described more specifically with reference to examples thereof.

EXAMPLES

Sample strips were formed by a rolling and rapid cooling method from amorphous alloys of the compositions shown in the following tables. Each strip was formed by employing a single rotating copper roll and a quartz nozzle through which a molten alloy was blown onto the roll by the pressure of argon gas. The roll was rotated at a speed of 500 to 2000 rpm and the argon gas was supplied at a pressure of 0.1 to 1 kg/cm². The molten alloy was rapidly cooled by a liquid to form a strip having a width of about 25 mm, a thickness of 32 to 49, μm and a length of about 20 to 30 m. It was ascertained by X-ray diffraction that every strip that had been prepared had an amorphous phase and a magnetic strain in the order of $10^{-6}$, or substantially zero.

The samples were tested for corrosion and wear resistance, as will hereunder be described.

Corrosion Resistance Tests

Each sample was polished to obtain a mirror surface and a magnetic tape was bonded thereto. The sample was, then, held at a temperature of 40° C. and a humidity of 95% for 96 hours. The test results are shown in TABLES 1 and 2.

Wear Resistance Tests

Magnetic heads of the type for an ordinary audio recording device were formed from amorphous alloys of various compositions. Each head was installed in a commercially available cassette tape deck and a commercially available normal magnetic tape was caused to move past the heads. The test was continued for 200 hours and each head was thereafter examined for wear. The test results are shown in TABLE 3.

TABLE 1 shows the results of the corrosion resistance tests conducted on the Fe-Co-Si-B alloys of various compositions containing chromium.

TABLE 1

| Alloy | Corrosion Resistance |
|---|---|
| $Co_{69.5}Fe_{4.5}Si_5B_{20}Cr_1$ | x |
| $Co_{69.5}Fe_{4.5}Si_{10}B_{15}Cr_1$ | x |
| $Co_{69.5}Fe_{4.5}Si_{15}B_{10}Cr_1$ | o |
| $Co_{68.5}Fe_{4.5}Si_5B_{20}Cr_2$ | x |
| $Co_{68.5}Fe_{4.5}Si_{10}B_{15}Cr_2$ | Δ |
| $Co_{68.5}Fe_{4.5}Si_{15}B_{10}Cr_2$ | o |
| $Co_{66.5}Fe_{4.5}Si_5B_{20}Cr_4$ | Δ |
| $Co_{66.5}Fe_{4.5}Si_{10}B_{15}Cr_4$ | o |
| $Co_{66.5}Fe_{4.5}Si_{15}B_{10}Cr_4$ | o |

Note:
o: No pit was observed;
Δ: some pits were observed;
x: many pits were observed.

FIG. 1 is a graph based on TABLE 1 and showing the relation between the ratio of $c/c+d$ and the amount of chromium in the alloys in which the corrosion resistance tests did not form any pit of corrosion. It is obvious from FIG. 1 that an alloy having a high ratio of $c/c+d$ has a high degree of corrosion resistance, even if it may have a low chromium content. The alloys having a $c/c+d$ ratio which is lower than 0.65 have a low crystallization temperature and the alloys having a ratio of $c/c+d$ which is higher than 0.55 have a satisfactorily high degree of wear resistance. According to FIG. 1, the alloys having a ratio of $c/c+d$ ranging from 0.55 to 0.65 and a satisfactorily high degree of corrosion resistance contain at least 1.0 atom % of chromium.

TABLE 2

| Alloy | Corrosion Resistance |
|---|---|
| $Co_{69.6}Fe_{4.5}Si_{15}B_{10}Cr_{0.4}Ru_{0.5}$ | x |
| $Co_{69.1}Fe_{4.5}Si_{15}B_{10}Cr_{0.4}Ru_{1.0}$ | x |
| $Co_{68.6}Fe_{4.5}Si_{15}B_{10}Cr_{0.4}Ru_{1.5}$ | o |
| $Co_{68.5}Fe_{4.5}Si_{15}B_{10}Cr_{0.5}Ru_{1.5}$ | o |
| $Co_{68.5}Fe_{4.5}Si_{15}B_{10}Cr_{1.0}Ru_{1.0}$ | o |
| $Co_{66.4}Fe_{4.5}Si_{15}B_{10}Cr_{2.6}Ru_{0.5}$ | o |
| $Co_{65.9}Fe_{4.5}Si_{15}B_{10}Cr_{2.6}Ru_{1.0}$ | o |

Note:
o: No pit was observed;
x: Pits were observed.

TABLE 2 shows the results of the corrosion resistance tests conducted on the alloys of various compositions containing chromium and ruthenium, too. It is obvious therefrom that the alloys containing appropriate amounts of chromium and ruthenium have a high degree of corrosion resistance.

Figure 2:
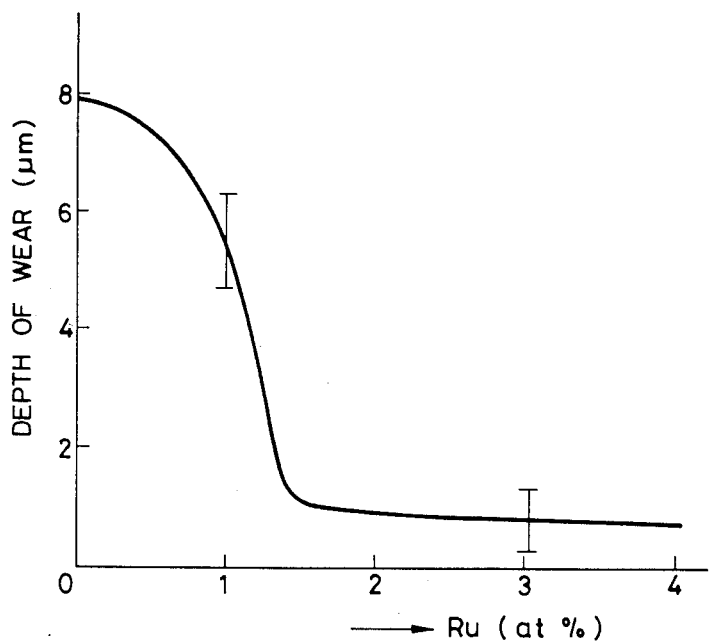
FIG. 2 is a graph showing the wear of alloys in relation to their ruthenium content.

TABLE 3 shows the results of the wear resistance tests conducted on the Fe-Co-Si-B alloys of various compositions further containing chromium and ruthenium and also the test results on the alloys containing no ruthenium. FIG. 2 is a graphical representation of the test results showing the wear of the alloys in relation to their ruthenium content. The alloys containing 1.5 to 4.0 atom % of ruthenium were worn to a greatly lower degree than the other alloys. It, therefore, follows that the alloys containing at least 1.5 atom % of ruthenium and having a high degree of wear resistance have a high degree of corrosion resistance if they contain a least 0.4 atom % of chromium.

TABLE 3

| Alloy | Depth of Wear ($\mu$m) |
|---|---|
| $Co_{72}Fe_{4.6}Cr_{0.4}Si_{13.8}B_{9.2}$ | 7.9 |
| $Co_{71.5}Fe_{4.6}Cr_{0.4}Ru_{0.5}Si_{13.8}B_{9.2}$ | 7.3 |
| $Co_{71}Fe_{4.6}Cr_{0.4}Ru_{1.0}Si_{13.8}B_{9.2}$ | 5.4 |
| $Co_{70}Fe_{4.6}Cr_{0.4}Ru_{2.0}Si_{13.8}B_{9.2}$ | 1.0 |
| $Co_{69}Fe_{4.6}Cr_{0.4}Ru_{3.0}Si_{13.8}B_{9.2}$ | 0.8 |
| $Co_{70.5}Fe_{4.6}Cr_{0.4}Ru_{1.5}Si_{13.8}B_{9.2}$ | 1.0 |
| $Co_{71.4}Fe_{4.6}Cr_{1.0}Si_{13.8}B_{9.2}$ | 7.9 |
| $Co_{70.9}Fe_{4.6}Cr_{1.0}Ru_{0.5}Si_{13.8}B_{9.2}$ | 7.3 |
| $Co_{70.4}Fe_{4.6}Cr_{1.0}Ru_{1}Si_{13.8}B_{9.2}$ | 5.4 |
| $Co_{69.4}Fe_{4.6}Cr_{1.0}Ru_{2}Si_{13.8}B_{9.2}$ | 1.0 |
| $Co_{68.4}Fe_{4.6}Cr_{1.0}Ru_{3}Si_{13.8}B_{9.2}$ | 0.8 |
| $Co_{69.8}Fe_{4.6}Cr_{2.6}Si_{13.8}B_{9.2}$ | 7.9 |
| $Co_{69.3}Fe_{4.6}Cr_{2.6}Ru_{0.5}Si_{13.8}B_{9.2}$ | 7.3 |
| $Co_{68.8}Fe_{4.6}Cr_{2.6}Ru_{1}Si_{13.8}B_{9.2}$ | 5.4 |
| $Co_{67.8}Fe_{4.6}Cr_{2.6}Ru_{2}Si_{13.8}B_{9.2}$ | 1.0 |
| $Co_{66.8}Fe_{4.6}Cr_{2.6}Ru_{3}Si_{13.8}B_{9.2}$ | 0.8 |

It is obvious from TABLE 3 that the wear resistance of an alloy of the formula according to this invention in which a is from 0.93 to 0.95, c/c+d is from 0.55 to 0.65, e is from 0.4 to 2.6 and b is from 22 to 27 depends on its ruthenium content. Its wear resistance increases with an increase in its ruthenium content. Its wear resistance is at least comparable to that of any of the presently available crystalline materials, such as hard Permalloys and Sendusts.

An alloy which can produce a reliable magnetic head is one having only a depth of wear not exceeding 1 $\mu$m when the head is used for 200 hours. It is, therefore, obvious from TABLE 3 that it is necessary to employ an alloy a ruthenium content of at least 1.5 atom %. Its ruthenium content should, however, be limited to a level not exceeding 4 atom %, since any alloy containing a still larger amount of ruthenium is difficult to make amorphous or machine by punching or stamping.

Figure 3:
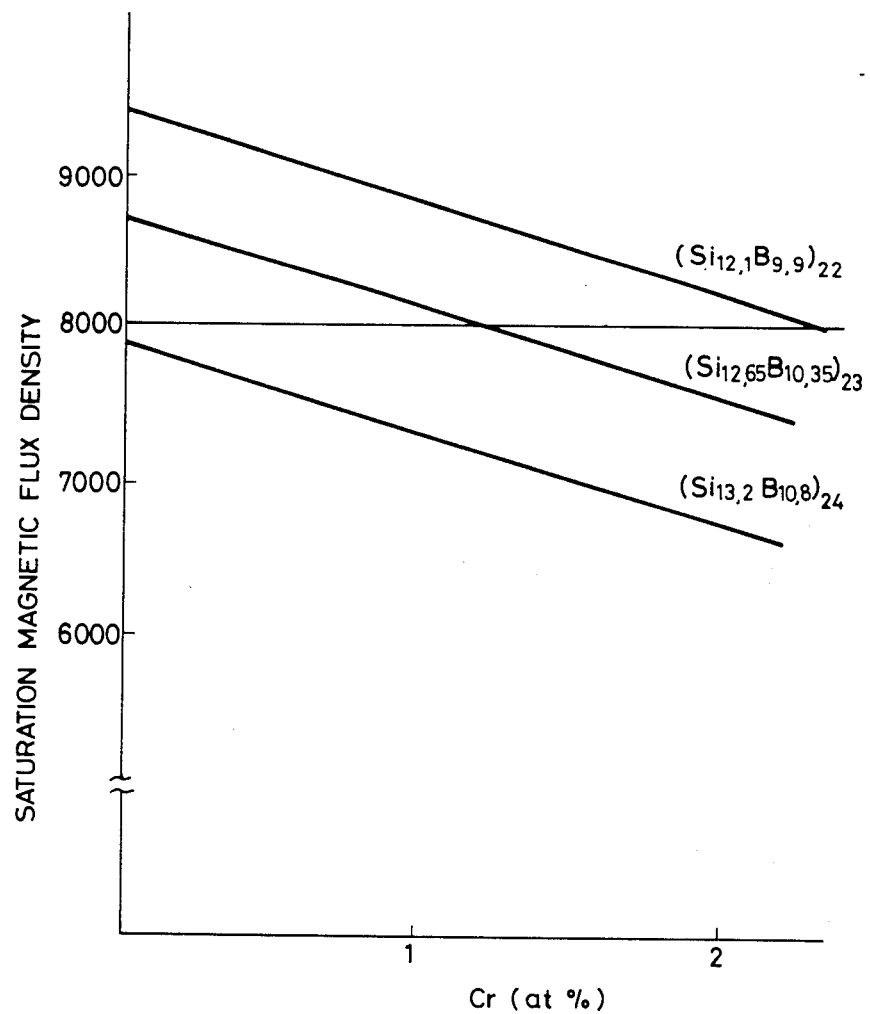
FIG. 3 is a graph showing the saturation magnetic flux density of alloys in relation to their chromium content.

FIG. 3 shows the saturation magnetic flux density of alloys of the formula in which a is 0.93, b is 22, e is 1.5 and c/c+d is 0.55, in relation to their chromium content. It is usually necessary to employ an alloy having a saturation magnetic flux density of at least 8000 G in order to make the core of a magnetic recording and reproducing head having satisfactory electromagnetic conversion characteristics. According to FIG. 3, therefore, it is effective to use an alloy having a chromium content not exceeding 2.6 atom %.

What is claimed is:

1. An amorphous alloy for making a magnetic head comprising a composition of the formula:

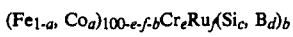

$$(Fe_{1-a}, Co_a)_{100-e-f-b}Cr_eRu_f(Si_c, B_d)_b$$

where a is from 0.93 to 0.95, c/c+d is from 0.55 to 0.65, b is from 22 to 27, e is from 0.4 to 2.6 and f is from 1.5 to 4.0.

2. An alloy as set forth in claim 1, wherein e is approximately 1.0.

* * * * *